R. A. SCHULTZ.
MILK AGITATOR.
APPLICATION FILED NOV. 16, 1912. RENEWED SEPT. 13, 1913.
1,082,100.
Patented Dec. 23, 1913.
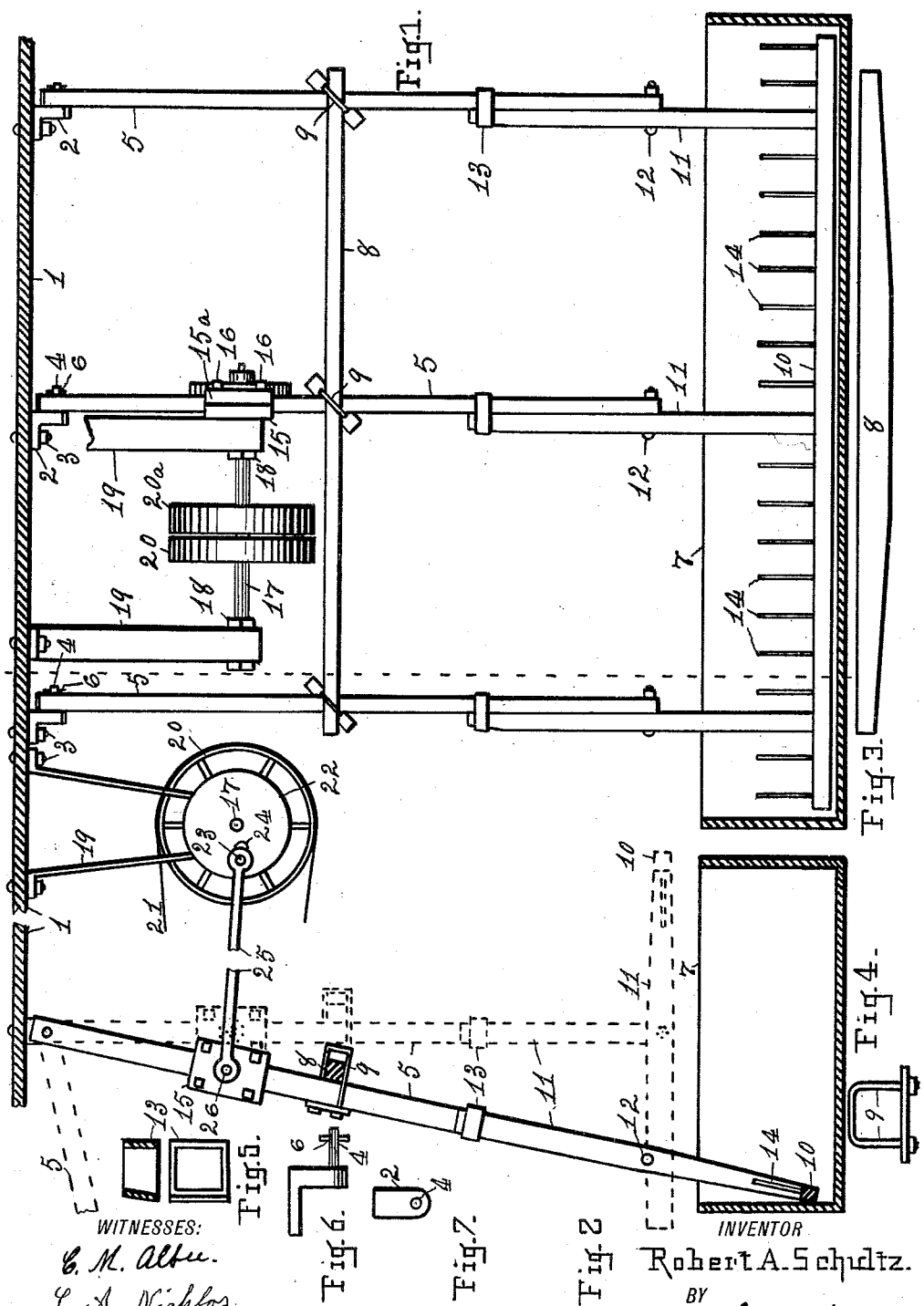

UNITED STATES PATENT OFFICE.

ROBERT A. SCHULTZ, OF MAPLE GROVE, WISCONSIN.

MILK-AGITATOR.

1,082,100. Specification of Letters Patent. Patented Dec. 23, 1913.

Application filed November 16, 1912, Serial No. 731,809. Renewed September 13, 1913. Serial No. 789,714.

*To all whom it may concern:*

Be it known that I, ROBERT A. SCHULTZ, a citizen of the United States, residing at Maple Grove, in the county of Manitowoc and State of Wisconsin, have invented a new and useful Milk-Agitator, of which the following is a specification.

My invention relates to a device for stirring milk in the process of cheese making, and consists of mechanism for performing by mechanical means what has for a long time usually been done with a tool in the hands of the cheese maker, and its object is, to lessen the manual labor in cheese making and at the same time leave the milk in a better condition than it would be, were the stirring of the milk performed with a tool in the hands of the cheese maker, the mechanism for it consisting of a swinging frame which is suspended from the over head work of the room in which the work is being carried on, and dropped down into the milk in a milk vat, the swinging frame being given motion transversely of the milk vat by means of a crank upon a shaft that is arranged for revolution and is provided with a connecting rod in engagement with the swinging frame, the part of the agitator that extends into the vat consisting of an inverted rake head and teeth, and being made to be swung upward out of the milk and the entire frame swung upward toward the ceiling and out of the way of the workmen around the vat, where it may be secured in any suitable manner.

The mechanism is shown in the accompanying drawing, in which,—

Figure 1 is a longitudinal elevation of the agitator frame and a shaft by which it is operated, with a milk vat in vertical section under the same. Fig. 2 is a vertical section of the milk vat transversely thereof and of the swinging frame to the right of the line *a, a*, of Fig. 1, its shaft and operating mechanism being in elevation. Fig. 3 is a plan of a stiffener bar that is clamped to the three swinging bars that carry the agitator rake head. Fig. 4 is a side elevation of a clamp bolt by which said stiffener bar is connected to the vertical swinging bars. Fig. 5 is a vertical section and plan respectively of a rectangular clamp for securing the rake head to the suspension bars. Fig. 6 is a side elevation of a bracket to be bolted to the over head work of a room from which the suspension bars are to be pivotally suspended. Fig. 7 is a face view of said bracket. Figs. 4, 5, 6 and 7, are upon a larger scale than the rest.

Similar numerals and letters indicate like parts in the several views.

1, indicates the ceiling or a part of the over head work of a room to which the milk agitator and its operating mechanism are secured; 2, brackets, of which three will ordinarily be sufficient, that are secured to the over head work with bolts 3, from which light bars of wood, 5, are suspended from pivot bolts 4, therein, and can be retained thereon with pins 6, or other convenient device. These bars are rectangular in cross section, and extend downward to a short distance above the milk vat 7. Intermediate their ends a stiffener bar 8, is secured to each bar 5 with clamps 9, (shown in elevation in Fig. 4,) said clamps inclosing both the bars 5 and bar 8, so that they are not weakened by boring holes through them. From the lower ends of the bars 5, an inverted rake head 10, is suspended, the rake head having handles 11, spaced to correspond with the position of the bars 5, and pivoted about midway their length to the lower ends of said bars upon bolts 12. A socket 13, formed of band metal is provided upon each bar 5 which is fitted to slide longitudinally thereon and slip over the upper end of the rake handle which is pivoted to it. It should be noted that the upper end of each handle is made tapering for fitting the bevel of the socket, as they are shown in Fig. 5 to be provided with a bevel at one end, so that the sockets will naturally work downward in the operation of the agitator and remain tightly around the bars and rake handles. The rake head is provided with a series of teeth 14, which extend upward therefrom and effectually stir the milk as the rake head is swung back and forth in the milk which may be in the vat.

The central suspension bar is provided with a metallic sleeve 15, which may be secured thereto in any suitable manner, but made in two like parts 15 and 15ª, which are bolted together with bolts 16, while gripping the bar and allowing for its longitudinal adjustment thereon, is a suitable manner in which it can be secured. By means of the above described longitudinal adjustment, the swinging movement of the rake head can be regulated to just strike the sides of the milk vat upon each side of the vat at each oscillation of the rake head. At a suitable distance from the suspended bars a shaft 17, is journaled for revolution in journal boxes 18, mounted in hangers 19, which are suspended from the over head work and secured thereto with bolts 3. Tight and loose pulleys 20 and 20ª, are mounted upon said shaft, the tight pulley having the belt 21 shifted to it the shaft can be revolved from any available source of power. A crank wheel 22, is mounted upon one end of the shaft and a crank pin 23, is held in a slot 24, from which a connecting rod 25 extends to the pin 26, which extends outward from the sleeve 15. By means of the slot in the crank wheel, the extent of the swinging movement of the rake head can be regulated the same as by moving the sleeve 15.

By swinging the frame and rake head to one side of the vat and slipping the sockets 13 off of the handles 11, the rake head can be swung into the position of it in broken lines in Fig. 2, and then by disconnecting the rod 25, the entire frame can be swung upward, as is shown by the end of the bar 5 shown in broken lines at the upper left hand corner in Fig. 2, and be secured in any convenient manner, out of the way of the workmen while doing other work around the vat. In using the agitator it is intended to swing the rake head the full width of the vat and contact with its sides slightly, so that there is a momentary rest in its movement which allows the milk to partially settle in readiness for the return movement of the rake, and thereby mix the milk in a thorough manner.

Having described my invention, what I claim and desire to secure by Letters Patent, is,—

1. A milk agitator, consisting of a vat for holding milk, a frame suspended for oscillation vertically over the longitudinal center of said vat and consisting of a plurality of bars suspended, each from a pivotal bracket secured to the over head work of a room, said bars extending downward to a point above the milk vat, a wrist pin upon one of said bars, a milk stirrer consisting of a rake head arranged near the bottom of the milk vat and a series of teeth spaced apart thereon, handles to the rake head corresponding in position thereon with the position of said oscillating bars pivoted intermediate their ends to the lower ends of said bars, and adapted to be swung at an angle therewith, means for holding said handles parallel with said bars, a shaft mounted for revolution in a suitable position relative to said frame, a crank upon said shaft, a wrist pin upon said crank and a rod connecting said wrist pin and the wrist pin upon one of said bars aforesaid.

2. A milk agitator, consisting of a vat for holding milk, a frame suspended for oscillation, vertically over the longitudinal center of said vat and consisting of a plurality of bars of wood suspended, each from a pivotal element secured to the over head work of a room and extending downward to a point above the vat, a horizontally arranged stiffener bar of wood connecting with each of said bars intermediate their ends and spacing them apart a rake head formed of wood, a series of teeth spaced a short distance apart extending upward from the rake head, handles of wood corresponding with the number and position of said suspended bars pivotally attached intermediate their ends to the lower ends of said bars, a socket mounted to slide upon each vertically suspended bar and inclose the outer end of a handle and clamp it alongside of one of said bars, and means for swinging said frame and rake head transversely of the milk vat.

3. In a milk agitator, a milk stirring device consisting of a frame formed of a plurality of bars of wood, each arranged to be suspended for oscillation from a pivotal element secured to the over head work of a room, a stiffener bar formed of wood arranged horizontally and connected to each suspended bar with a clamp bolt inclosing both vertical and horizontal bars, a rake head formed of wood, a series of teeth extending upward from the rake head and spaced a short distance apart thereon, handles corresponding in number and position with the number and position of said suspended bars extending upward from the rake head and pivoted intermediate their ends to the lower ends of their respective suspension bars, and a metallic rectangular socket for each handle slidably arranged upon each suspension bar, one end of which sockets is angularly disposed relative to the other end and is adapted to fit at said angular disposed end the tapering end of a handle and thereby have a tendency to become tightened thereon when in use.

4. In a milk agitator for a milk vat, a milk stirring device consisting of a rake head arranged for a swinging movement transversely of the milk vat, a series of rake teeth spaced a short distance apart and extending upward from said rake head and a plurality of handles by which the rake head can be swung.

ROBERT A. SCHULTZ.

Witnesses:
Emma A. Briggs,
C. M. Albee.